US008530769B2

(12) United States Patent
Tadano

(10) Patent No.: US 8,530,769 B2
(45) Date of Patent: Sep. 10, 2013

(54) INFORMATION PROCESSING APPARATUS AND SWITCH DEVICE

(75) Inventor: Junichi Tadano, Nagano (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 13/146,674

(22) PCT Filed: Dec. 17, 2010

(86) PCT No.: PCT/JP2010/007316
§ 371 (c)(1),
(2), (4) Date: Jul. 28, 2011

(87) PCT Pub. No.: WO2011/077677
PCT Pub. Date: Jun. 30, 2011

(65) Prior Publication Data
US 2011/0279957 A1    Nov. 17, 2011

(30) Foreign Application Priority Data

Dec. 24, 2009  (JP) ................................ 2009-293397

(51) Int. Cl.
*H01H 15/10*  (2006.01)
(52) U.S. Cl.
USPC ........................................................ 200/547
(58) Field of Classification Search
USPC ............... 200/547, 536, 17 R, 5 A, 5 R, 6 A, 200/4
See application file for complete search history.

(56) References Cited

U.S. PATENT DOCUMENTS

| 4,361,739 | A | * | 11/1982 | Harata et al. ................. 200/16 C |
| 4,475,015 | A | * | 10/1984 | Kobayashi et al. ............ 200/5 R |
| 5,327,162 | A | * | 7/1994 | Soma ............................. 345/161 |
| 6,689,967 | B2 | * | 2/2004 | Myojin ............................ 200/18 |
| 6,834,238 | B1 | * | 12/2004 | Hochman ........................ 702/21 |
| 6,906,269 | B2 | * | 6/2005 | Nishimura et al. ............... 200/4 |
| 7,294,795 | B1 | * | 11/2007 | Kondo et al. .................. 200/5 R |
| 2005/0269190 | A1 | | 12/2005 | Hecht |

FOREIGN PATENT DOCUMENTS

| JP | 63 80735 | 5/1988 |
| JP | 4 10940 | 1/1992 |
| JP | 6 5156 | 1/1994 |
| JP | 8 77882 | 3/1996 |
| JP | 2002 75132 | 3/2002 |
| JP | 2008 502103 | 1/2008 |

OTHER PUBLICATIONS

International Search Report issued Mar. 15, 2011 in PCT/JP10/07316 filed Dec. 17, 2010.

* cited by examiner

*Primary Examiner* — Xuong Chung Trans
(74) *Attorney, Agent, or Firm* — Oblon, Spivak, McClelland, Maier & Neustadt, L.L.P.

(57) ABSTRACT

[Object] To provide an information processing apparatus including a small slide switch unit enabling direct slide movement to a desired position, and capable of easily and surely switching a plurality of modes with the switch unit.

[Solving Means] The information processing apparatus includes a switch unit (7) and a control section. The switch unit (7) includes a movable portion (200), a cover (500), a guide portion (100), and a switch module (300). The cover (500) and the guide portion (100) support the movable portion (200) so as to be directly movable between two positions of all the combinations of three or more positions. The switch module (300) detects that the movable portion (200) has moved to each of the positions. The control section controls based on a detecting result by the switch module (300).

5 Claims, 15 Drawing Sheets

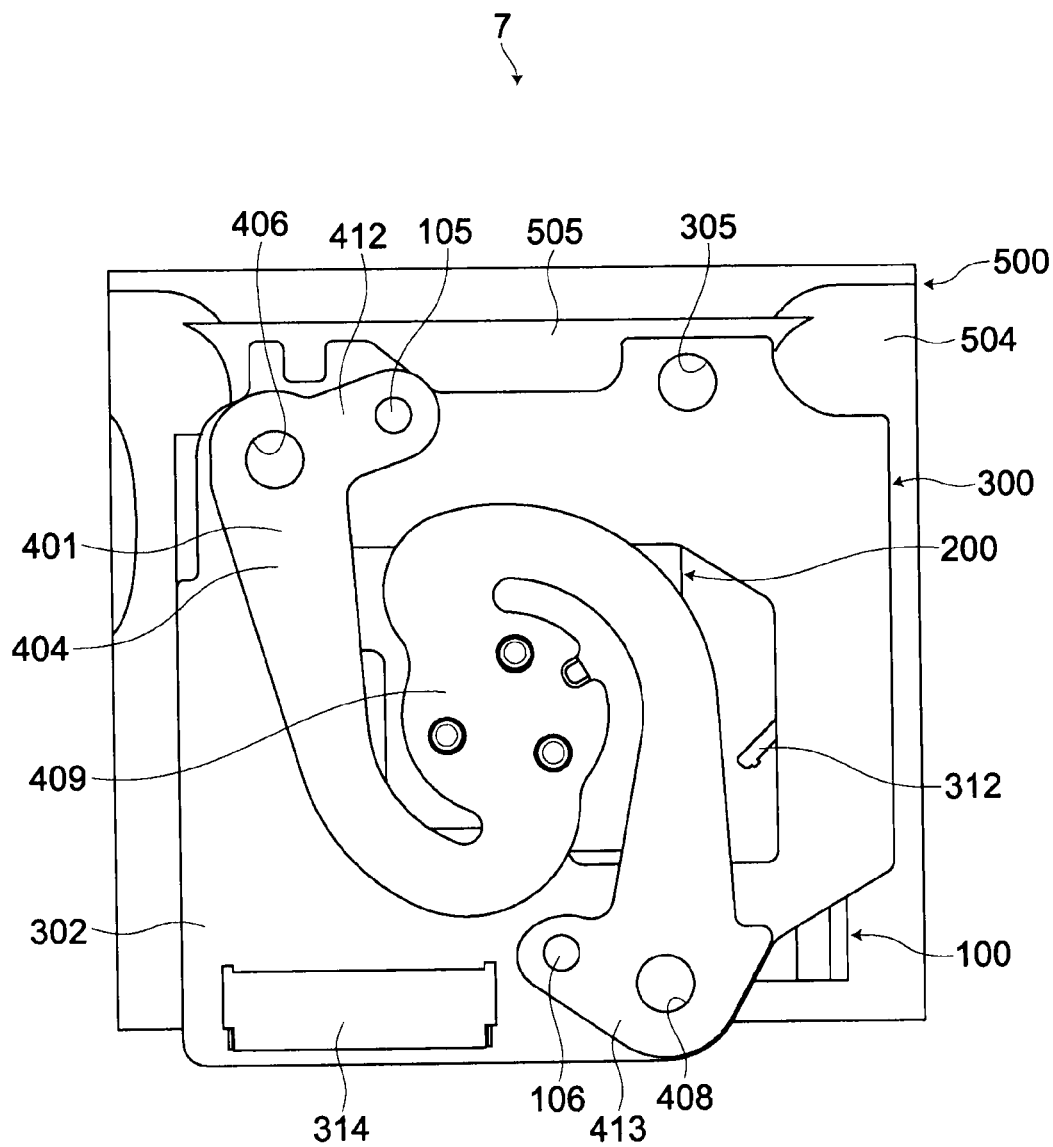
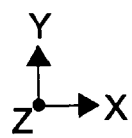
FIG.8

(a)
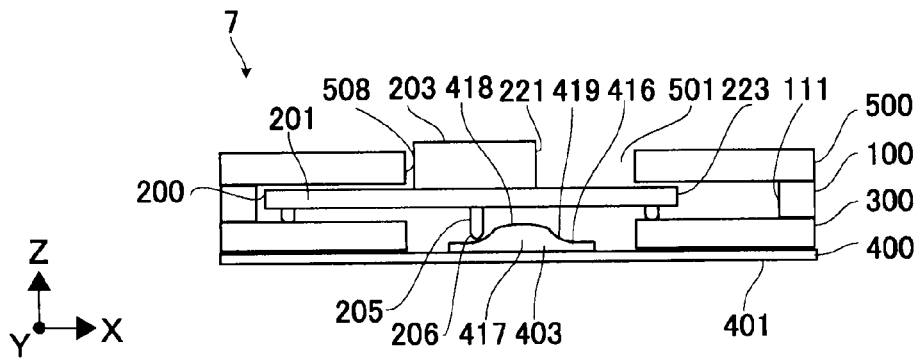
(b)
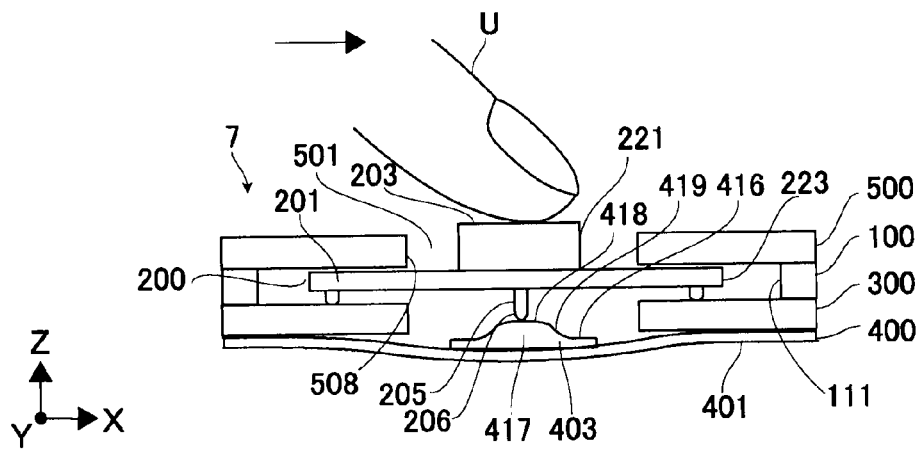
(c)
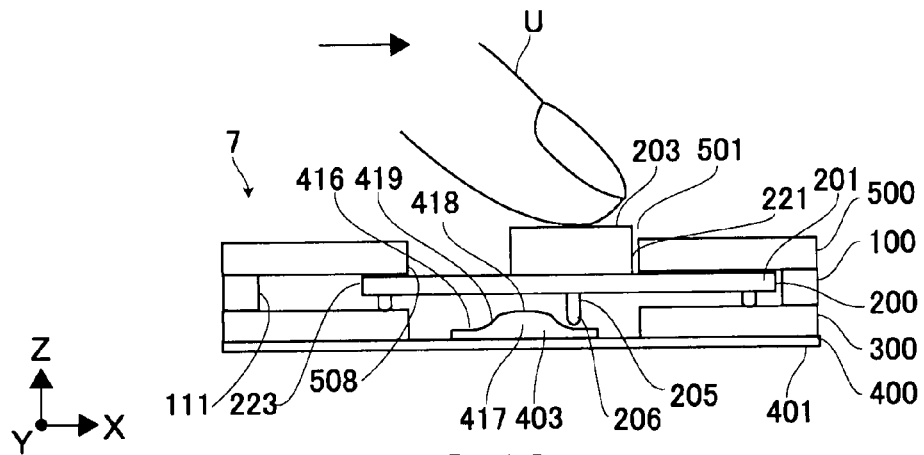
FIG.12

INFORMATION PROCESSING APPARATUS AND SWITCH DEVICE

TECHNICAL FIELD

The present invention relates to an information processing apparatus including a switch unit, and a switch device.

BACKGROUND ART

There is provided an electronic apparatus capable of executing a plurality of modes and capable of switching the plurality of modes by using a switch unit (for example, see Patent Document 1). On the electronic apparatus of Patent Document 1, a slide knob capable of slide-moving over three mode positions provided on a straight line is provided. By slide-moving the slide knob to a desired mode position, in accordance with the mode position, modes can be switched. On the electronic apparatus, an engaging means restricting, when the slide knob is moved from one end mode position in a slide direction to a middle mode position, further movement of the slide knob to the other end mode position in the slide direction is further provided. As a result, mode switching mistakes can be prevented.

PRIOR ART DOCUMENT

Patent Document

Patent Document 1: Japanese Patent Application Laid-open No. H6-5156 (paragraph [0008], FIG. 1)

DISCLOSURE OF THE INVENTION

Problem to be Solved by the Invention

However, according to the electronic apparatus of Patent Document 1, in a case of moving the slide knob from one end mode position in the slide direction to the other end mode position, the movement is inevitably restricted in the middle mode position. Therefore, in a case where it is wished to directly switch from the mode corresponding to one end mode position to the mode corresponding to the other end mode position, if the slide knob is located in the middle mode position, there is a fear that the mode corresponding to the middle mode position may be executed. Therefore, a mechanism for distinguishing an operation that the slide knob passes by the middle mode position and a movement operation of the slide knob for switching modes is required, and the like, and there is a fear that the structure be complicated.

Further, in a case where, in order to be capable of directly switching a plurality of modes, switches for the respective modes are individually provided, there is a fear that the size of the whole switches be larger.

In view of the above-mentioned circumstances, an object of the present invention is to provide an information processing apparatus including a small switch unit capable of directly moving a movable portion to a desired position, and capable of easily and surely switching a plurality of operating states with the switch unit. Another object of the present invention is to provide a small switch device capable of directly moving a movable portion to a desired position.

Means for Solving the Problem

To attain the above-mentioned object, an information processing apparatus according to one embodiment of the present invention includes a switch unit and a control section.

The switch unit includes a movable portion, a support portion, and a detecting section.

The movable portion is capable of being operated by a user.

The support portion supports the movable portion so as to be directly movable between two positions of all the combinations of three or more positions.

The detecting section detects that the movable portion has moved to each of the positions.

The control section recognizes a detecting result by the detecting section.

As a result, in whichever position the movable portion is located, it is possible to directly move the movable portion to the other respective positions. As a result, a switch selection operation by a user is made easier, and also, the structure of the control section recognizing, based on a detection result of a position to which the movable portion has been moved, the switch selection operation by a user is simplified.

The switch unit may further include a position-keeping means keeping the movable portion in each of the positions.

As a result, the movable portion can be made stable in the respective positions, and operating errors of the switch unit can be prevented.

The switch unit may further include an engaging portion having a first tapered surface and a second tapered surface provided between the respective two positions and causing interference with the movable portion at different timings in the process of movement of the movable portion between the respective two positions, respectively, the first tapered surface restricting the movement of the movable portion, the second tapered surface urging movement of the movable portion.

As a result, it is possible to give different changes of feelings of resistance at the timing that the movable portion causes interference with the first tapered surface and at the timing that the movable portion causes interference with the second tapered surface to a user operating the movable portion, respectively.

The switch unit may further include a biasing means biasing the respective tapered surfaces of the engaging portion and the movable portion so as to be in pressure-contact.

At the interference position with the first tapered surface, the movable portion presses down the first tapered surface against the bias force of the biasing means. Therefore, in this period of time, the user senses a feeling of resistance in the movement operation of the movable portion. The feeling of resistance suddenly decreases in a state where the movable portion leaves the first tapered surface. Such a change of the feeling of resistance is given to the user as a click feeling.

When the movable portion reaches the interference position with the second tapered surface, because of the bias force of the biasing means, the movable portion is pulled-in along the second tapered surface, and as a result, movement of the movable portion is urged. Because of such a bias force of the biasing means and taper effects of the second tapered surface, the operation of leading the movable portion is supplied to the user as a pull-in feeling.

The control section may switch an operation processing of the information processing apparatus based on the detection result.

As a result, it is possible to directly switch two operating states of all the combinations of three or more controls.

A switch device according to an embodiment of the present invention includes a movable portion, a support portion, and a detecting section.

The movable portion is capable of being operated by a user.

The support portion supports the movable portion so as to be directly movable between two positions of all the combinations of three or more positions.

The detecting section detects that the movable portion has moved to each of the positions.

As a result, in whichever position the movable portion is located, it is possible to directly move the movable portion to the other respective positions.

The switch device may further include a position-keeping means keeping the movable portion in each of the positions.

As a result, the movable portion can be made stable in the respective positions, and operating errors of the switch unit can be prevented.

The switch device may further include an engaging portion having a first tapered surface and a second tapered surface provided between the respective two positions and causing interference with the movable portion at different timings in the process of movement of the movable portion between the respective two positions, respectively, the first tapered surface restricting the movement of the movable portion, the second tapered surface urging movement of the movable portion.

As a result, it is possible to give different changes of feelings of resistance at the timing that the movable portion causes interference with the first tapered surface and at the timing that the movable portion causes interference with the second tapered surface to a user operating the movable portion, respectively.

The switch device may further include a biasing means biasing the respective tapered surfaces of the engaging portion and the movable portion so as to be in pressure-contact.

At the interference position with the first tapered surface, the movable portion presses down the first tapered surface against the bias force of the biasing means. Therefore, in this period of time, the user senses a feeling of resistance in the movement operation of the movable portion. The feeling of resistance suddenly decreases in a state where the movable portion leaves the first tapered surface. Such a change of the feeling of resistance is given to the user as a click feeling.

When the movable portion reaches the interference position with the second tapered surface, because of the bias force of the biasing means, the movable portion is pulled-in along the second tapered surface, and as a result, movement of the movable portion is urged. Because of such a bias force of the biasing means and taper effects of the second tapered surface, the operation of leading the movable portion is supplied to the user as a pull-in feeling.

Effect of the Invention

According to the present invention, an information processing apparatus including a small switch unit capable of directly moving a movable portion to a desired position, and capable of easily and surely switching a plurality of operating states with the switch unit can be provided. According to the present invention, further, a small switch device capable of directly moving a movable portion to a desired position can be provided.

BRIEF DESCRIPTION OF DRAWINGS

FIG. 8 A lower surface view of the switch unit.

FIG. 12 Schematic diagrams showing an operation of a movable portion and the restriction portion.

BEST MODE FOR CARRYING OUT THE INVENTION

Hereinafter, an embodiment of the present invention will be described with reference to the drawings. In this embodiment, a laptop (Personal Computer. Hereinafter, simply referred to as PC) will be described as an example of an information processing apparatus.

[1. Structure of PC]

Figure 1:
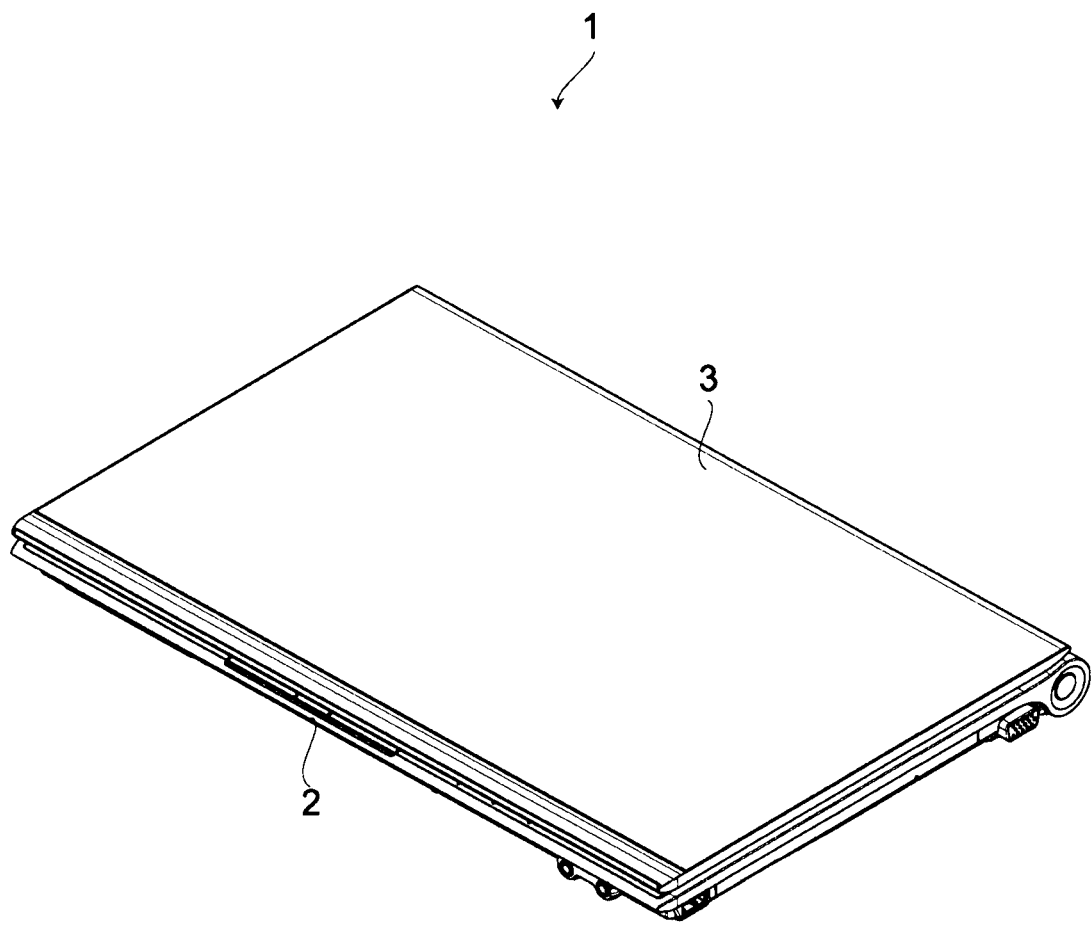
FIG. 1 A perspective view showing a PC (Personal Computer) according to one embodiment of the present invention in a closed state.

FIG. 1 is a perspective view showing a PC according to one embodiment of the present invention in a closed state.

A PC 1 includes a main body unit 2 and a display unit 3.

Figure 2:
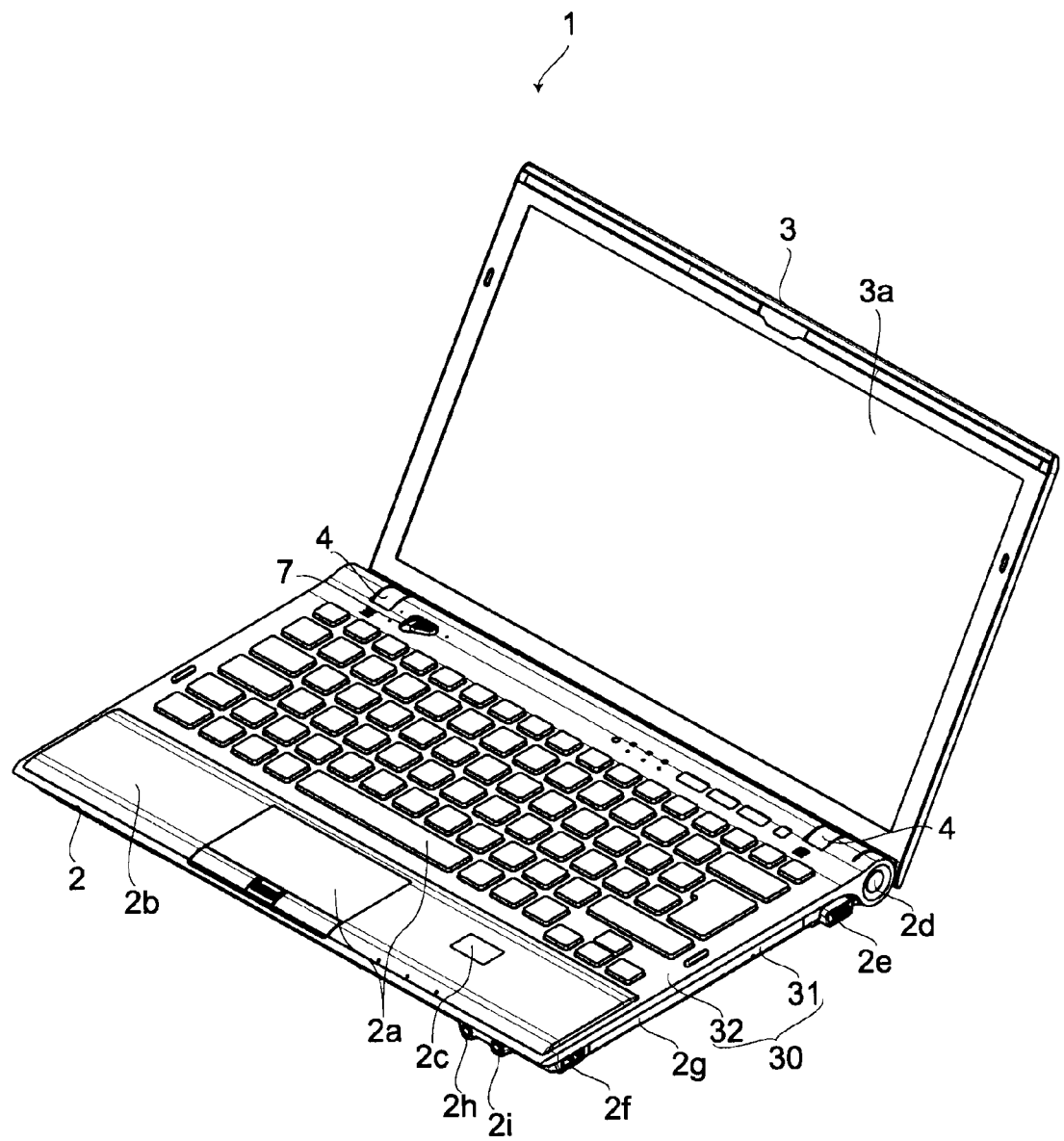
FIG. 2 A perspective view showing the PC of FIG. 1 in an open state.

FIG. 2 is a perspective view showing the PC 1 in an open state.

The main body unit 2 and the display unit 3 are relatively-rotatably coupled by the hinges 4. The display unit 3 includes, in the area facing the main body unit 2 when the display unit 3 is closed with respect to the main body unit 2, a display screen 3a.

The main body unit 2 includes, in the area facing the display unit 3 when the display unit 3 is closed with respect to the main body unit 2, an input operation unit 2a such as a keyboard, a palm rest 2b on which a user places his wrists during input operations, an antenna 2c for contactless IC (Integrated Circuit) cards, and a slide switch unit 7 (switch device). The main body unit 2 further includes, on side surfaces of the main body unit 2, a power switch 2d, an external display output terminal 2e, a USB (Universal Serial Bus) connecter 2f, a disc insertion slot 2g of a disc drive (not shown), a microphone input terminal 2h, and a headphone output terminal 2i. Note that the structure of the switch unit 7 will be described in detail later.

The main body unit 2 further includes a casing 30 obtained by assembling a top case 32 and a bottom case 31. On the top case 32, the above-mentioned input operation unit 2a, switch unit 7, and the like are provided. The bottom case 31 includes a laying surface with which the PC 1 is laid on a desk or the like. The main body unit 2 further includes, inside the casing 30, a motherboard 10, a cooling fan 20, and the like.

Figure 3:
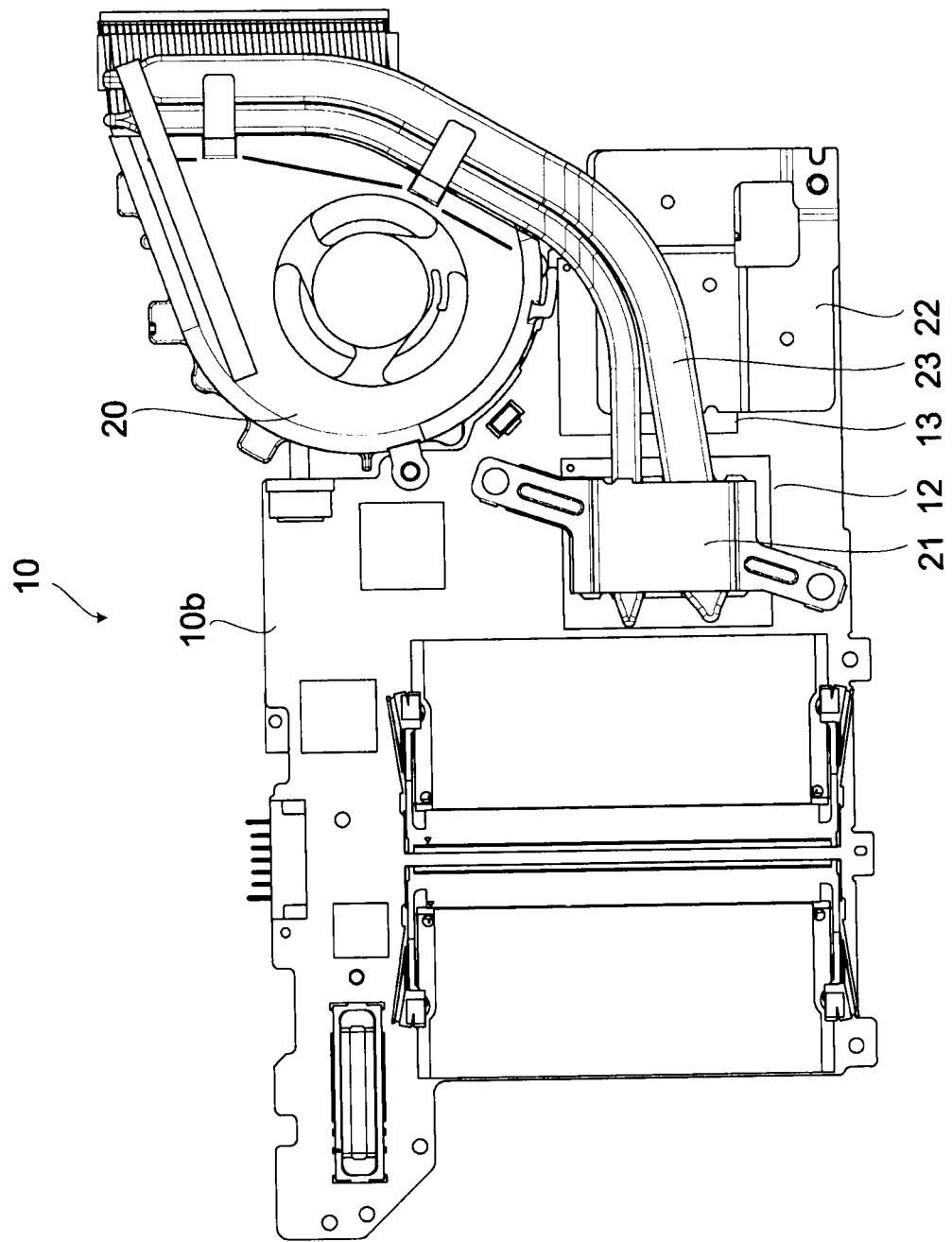
FIG. 3 A plan view showing a motherboard and a cooling fan from a lower surface side.
Figure 4:
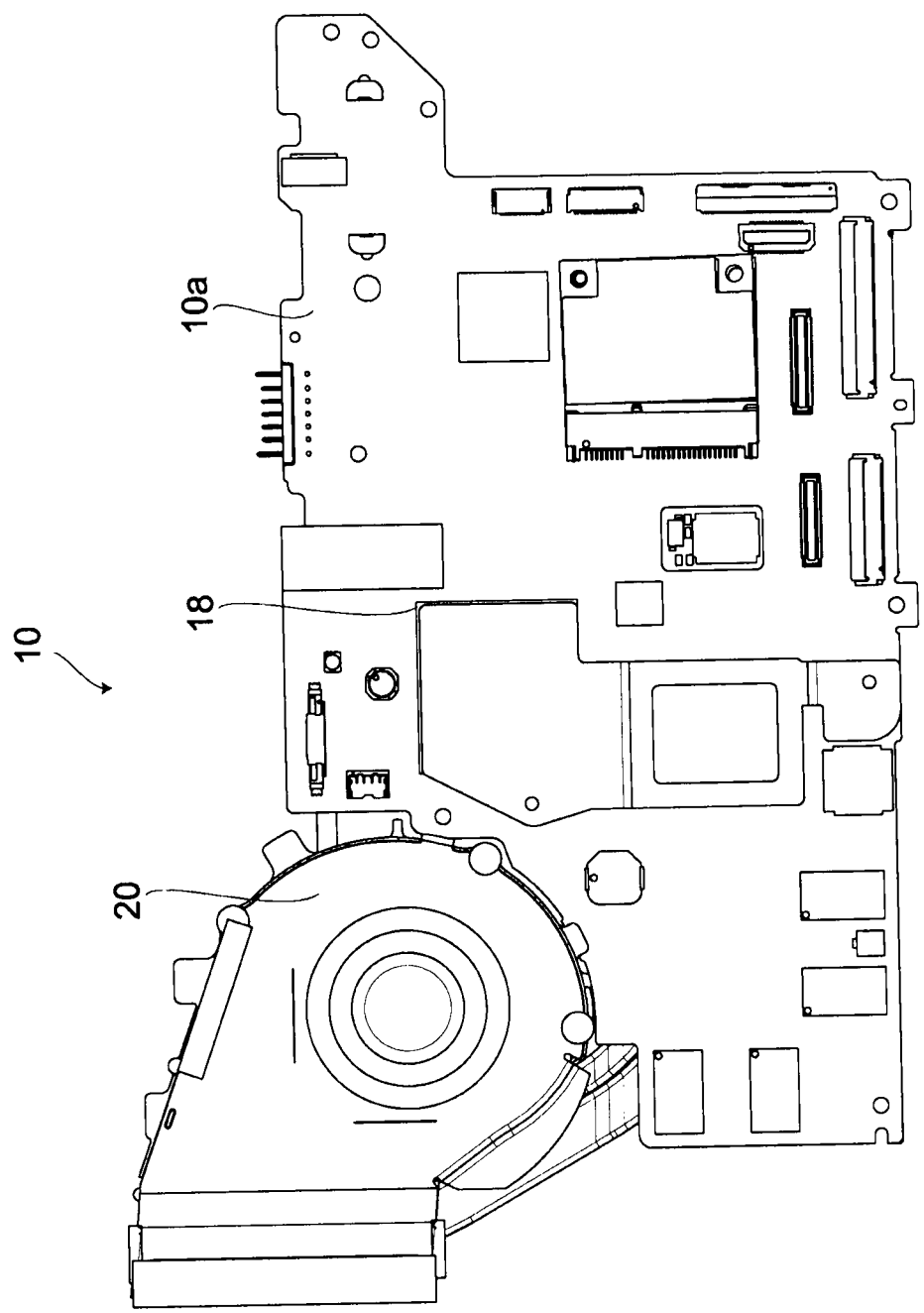
FIG. 4 A plan view showing the motherboard and the cooling fan from an upper surface side.

FIG. 3 is a plan view showing the motherboard and the cooling fan from a lower surface side. FIG. 4 is a plan view showing the motherboard and the cooling fan from an upper surface side.

On an upper surface 10a and a lower surface 10b of the motherboard 10, a main memory, a CPU 12, an external graphics chip 13, a chip set 18, and other electronic components such as a control circuit are mounted.

On an upper surface of the CPU 12, a heat receiving plate 21 is provided in an intimate-contact manner, and, on an upper surface of the external graphics chip 13, a heat receiving plate 22 is provided in an intimate-contact manner. To the heat receiving plates 21, 22, a heat pipe 23 is thermally connected, and, to the heat pipe 23, the cooling fan 20 is thermally connected. The cooling fan 20 provides cooling for heat-producing devices such as the CPU 12, the external graphics chip 13, and the like mounted on the motherboard 10.

The chip set 18 is a chip managing passing data with the respective devices in the PC 1. The chip set 18 includes an internal graphics chip and the like. Further, the chip set 18 includes connection interfaces to respective peripheral devices such as a nonvolatile memory, an EC (Embedded Controller), and the like.

The external graphics chip 13 and the internal graphics chip perform drawing processing based on data that the CPU 12 output, and output generated image signals to display on the display screen 3a of the display unit 3.

The internal graphics chip is inferior in drawing processing power compared to the external graphics chip 13, but low in power consumption. Meanwhile, although the external graphics chip 13 has a high processing power in 3D processing, high-resolution drawing processing, and the like, because it drives itself and the peripheral devices, the power consumption becomes higher and an electric load with respect to the entire system of the PC 1 becomes higher. Therefore, the external graphics chip 13 is useful, for example, in a case of using the PC 1 to which an external monitor or an AC (Alternating Current) adapter is connected, a case of driving a Blu-ray Disc drive, a case of executing a 3D application, a case of displaying a high-resolution image, and the like. Meanwhile, the internal graphics chip is useful in a case where a remaining amount of a battery is getting lower, a case of decreasing rpm of the fan to make it quiet, and the like.

Note that the PC 1 includes, not only the above, but devices required for a computer such as a battery, an HDD (Hard Disk Drive), interfaces such as terminals, and the like.

[2. One Example of Operating State of PC]

Next, one example of an operating state of the PC 1 will be described. The PC 1 is capable of executing a mode of executing drawing processing by the internal graphics chip, a mode of executing drawing processing by the external graphics chip 13, and a mode of determining a usage of the PC 1 and executing drawing processing by a graphics chip suitable for the present usage. The PC 1 switches those three modes, and executes any one mode. As a result, one of the internal graphics chip and the external graphics chip 13 executes drawing processing.

Switching of the graphics chips executing drawing processing can be performed by, for example, controlling, by the EC as a control section, ON/OFF states of power supply to the external graphics chip 13, and the like.

That is, the EC obtains a detection result of a switch selection position that a switch module 300 (described later) of the switch unit 7 detected. The EC outputs, based on the obtained detection result, a power ON/OFF control signal for switching a power supply ON/OFF state with respect to the external graphics chip 13 to a power supply circuit (not shown). The power supply circuit switches, based on the power ON/OFF control signal from the EC, the power supply ON/OFF state with respect to the external graphics chip 13. Because a power is supplied from the power supply circuit to the external graphics chip 13, drawing processing can be executed by the external graphics chip 13. Meanwhile, when a power is not supplied to the external graphics chip 13 from the power supply circuit, drawing processing is executed only by the internal graphics chip.

[3. Structure of Switch Unit]

Next, a structure of the switch unit 7 will be described. Note that, when the description describes the switch unit 7, it is assumed that it includes part of the top case 32 of the casing 30. The part of the top case 32 included in the switch unit 7 is referred to as "cover 500".

Figure 5:
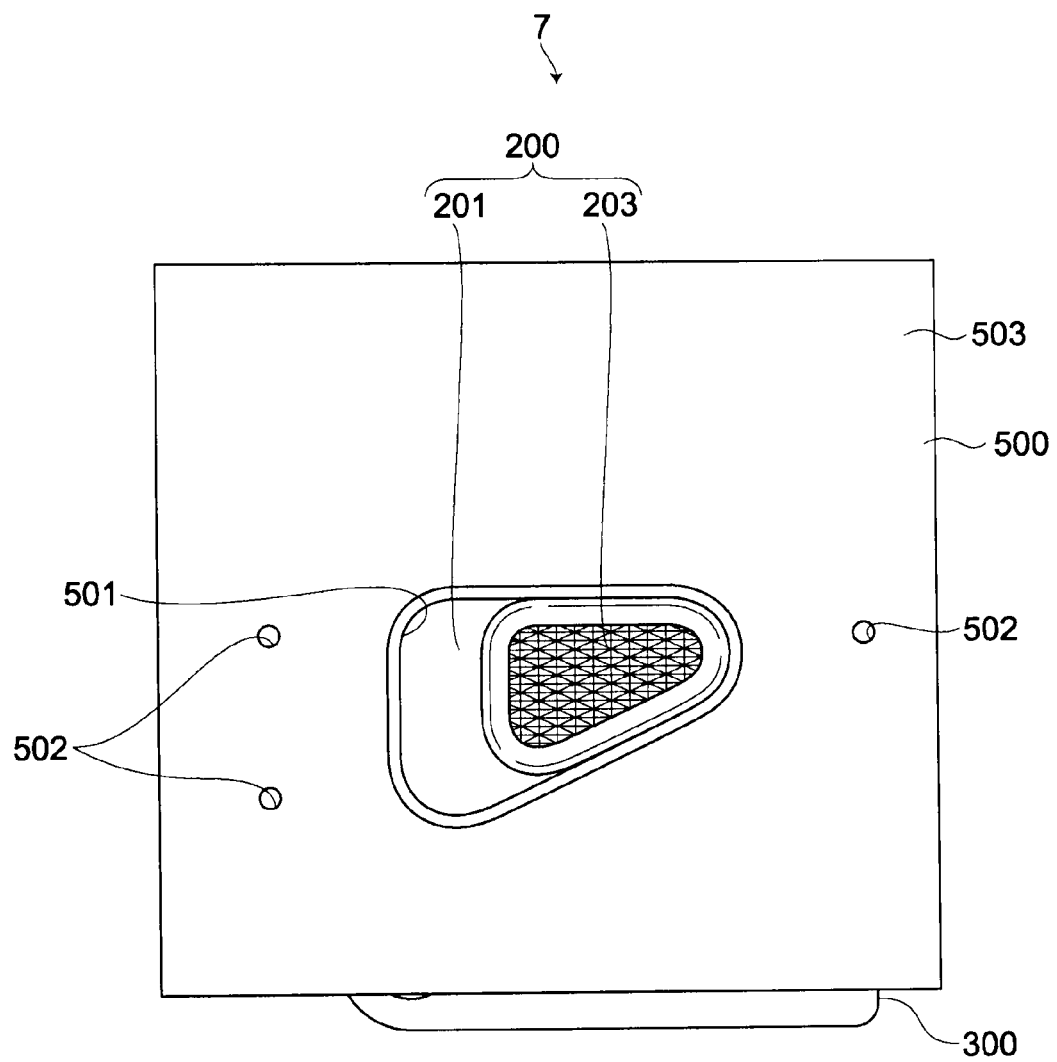
FIG. 5 A top view of a switch unit.

FIG. 5 is a top view of the switch unit 7. The switch unit 7 is slide switch unit allowing a user to select, for example, three modes of drawing processing. By moving an operation portion 203 of a movable portion 200 exposed from a cover opening 501 of the cover 500 to a predetermined position in the cover opening 501, a drawing processing mode can be switched. In this embodiment, the operation portion 203 is directly movable between two positions of all the combinations of positions corresponding to three apexes of the cover opening 501 being a round-corner triangle.

Figure 6:
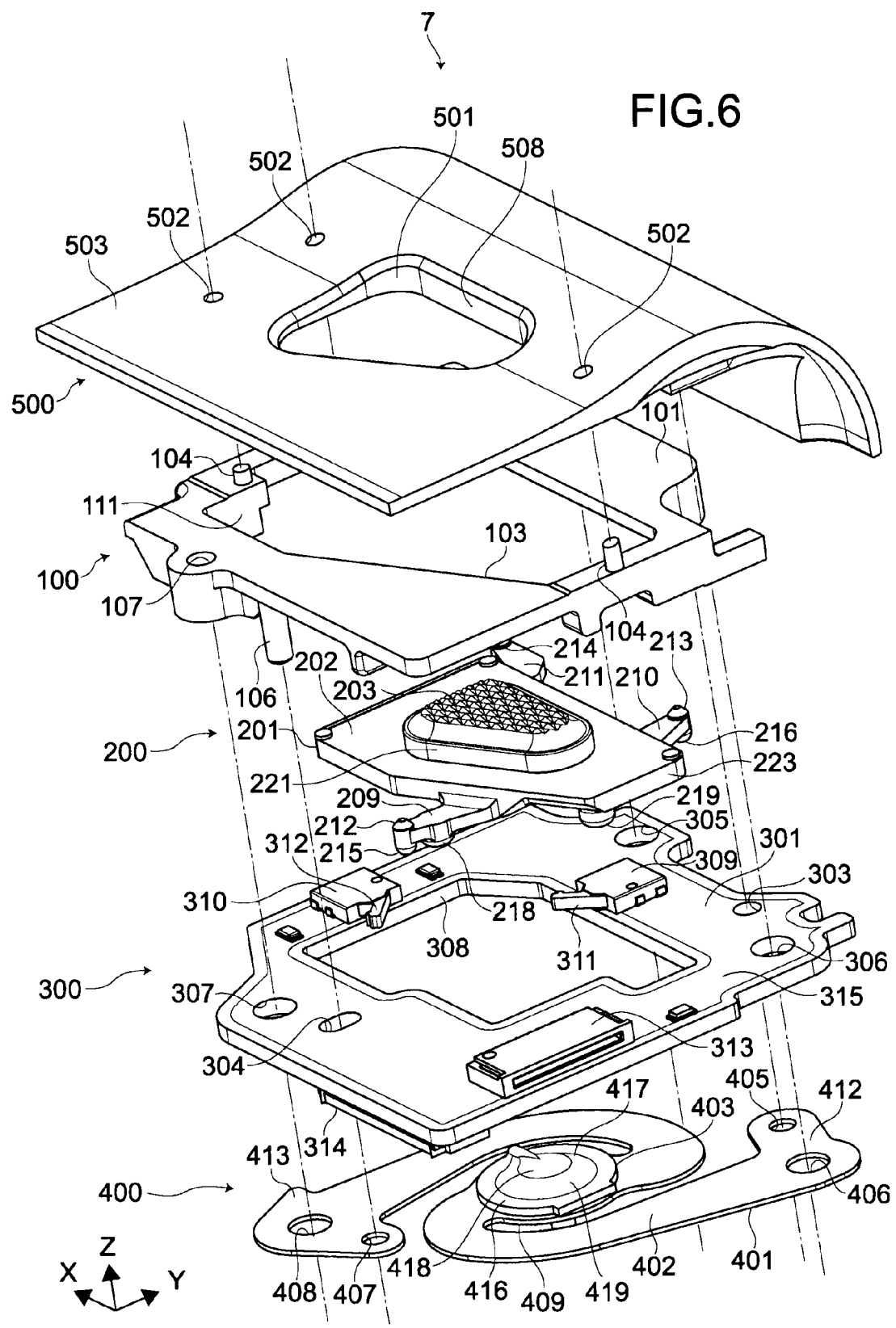
FIG. 6 An exploded perspective view of the switch unit.
Figure 7:
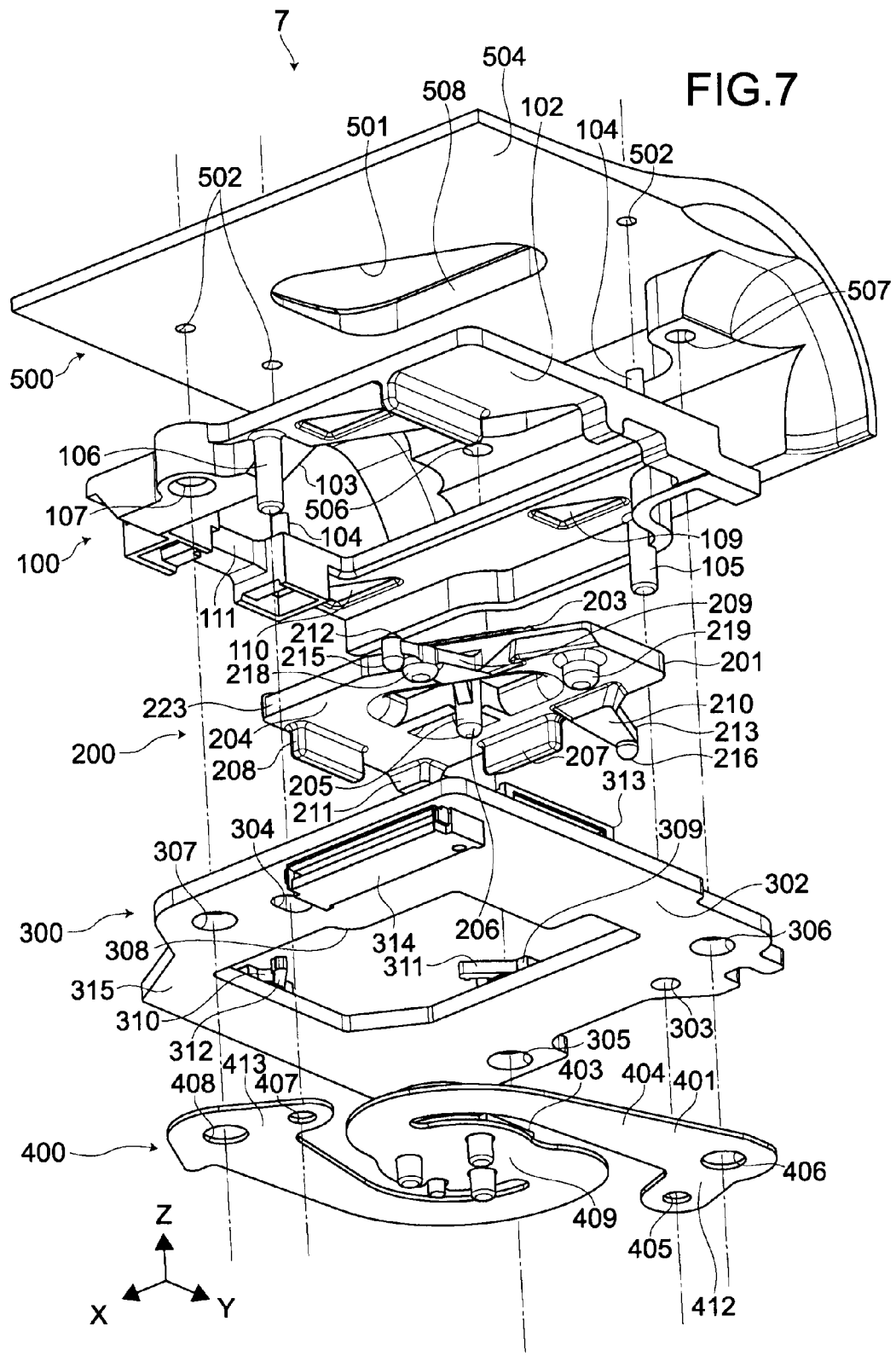
FIG. 7 Another exploded perspective view of the switch unit.

FIG. 6 is an exploded perspective view of the switch unit 7 and shows the switch unit 7 from the top case 32 side (the cover 500 side). FIG. 7 is another exploded perspective view of the switch unit 7 and shows the switch unit 7 from the bottom case 31 (see FIG. 2) side. FIG. 8 is a lower surface view of the switch unit 7. Note that, in the description, when respective members are located in the casing 30, surfaces facing the top case 32 are referred to as "upper surfaces", and surfaces facing the bottom case 31 are referred to as "lower surfaces".

The switch unit 7 includes the cover 500 (support portion), a guide portion 100 (support portion), the movable portion 200, the switch module 300 (detecting section), and a restriction portion 400. The respective members are assembled, from the top case 32 side (the cover 500 side) to the bottom case 31 side, in this order.

[3-1. Structure of Cover]

The cover 500 is a member protecting an inner portion of the switch unit 7 and also guiding the movement of the movable portion 200.

The cover 500 is made of, for example, metal such as aluminum, resin, or the like. On the cover 500, the cover opening 501 penetrating an upper surface 503 side and a lower surface 504 side is provided. The cover opening 501 guides the operation portion 203 of the movable portion 200 so as to be movable in the surface direction of the cover opening 501. In this embodiment, the cover opening 501 has a round-corner triangle shape. On the cover 500, a boss hole 506 for securing the switch module 300 to the cover 500 by a screw, and a boss hole 507 for securing the switch module 300 and the restriction portion 400 to the cover 500 by a screw are provided.

In the vicinity of the cover opening 501, three LED (Light Emitting Diode) openings 502 are provided in correspondence with the three selection positions of the switch unit. Below the cover 500, a light guiding system for guiding lights from a plurality of light-emitting sources such as, for example, LEDs or the like provided on the main body unit 2 of the PC 1 to the respective LED openings 502 is provided. Further, in those three LED openings 502, in accordance with a selection position selected in the switch unit 7, that is, a drawing processing mode, a light is exposed only from one LED opening 502 and stays on/flashes, whereby it is possible to show a mode selection state to a user.

[3-2. Structure of Guide Portion]

In the lower surface 504 side of the cover 500, the guide portion 100 is provided. The guide portion 100 is a member for cooperating with the cover opening 501 to thereby guide a movement of the movable portion 200.

The guide portion 100 is structured by, for example, light-guiding resin or the like. The guide portion 100 is fixed with respect to the lower surface of the cover 500. That is, on an upper surface 101 of the guide portion 100, three insertion portions 104 inserted into the three LED openings 502 of the cover 500, respectively, are provided. Because of those insertion portions 104, positioning of the guide portion 100 with respect to the cover 500 at three points and light-guiding to the respective LED openings 502 are attained. The upper surface 101 of the guide portion 100 is adhesively attached on the lower surface 504 of the cover 500 with a double-faced tape.

On the guide portion 100, a guide opening 103 penetrating the upper surface 101 side and a lower surface 102 side is provided. The guide opening 103 guides a plate portion 201 (described later) of the movable portion 200 by an inner periphery 111 so as to be movable in the surface direction of the guide opening 103.

Note that, in the following description, two axes forming an opening surface of the guide opening 103 are referred to as "X axis" and "Y axis". An axis orthogonal to the opening surface of the guide opening 103 is referred to as "Z axis". Further, a direction on the Z axis from the bottom case 31 side to the top case 32 side (cover 500 side) is referred to as "Z-axis up direction". A direction on the Z axis from the top case 32 side (cover 500 side) to the bottom case 31 side is referred to as "Z-axis down direction".

On the lower surface 102 of the guide portion 100, bosses 105, 106 for keeping the switch module 300 and the restriction portion 400 in position with respect to the guide portion 100 and a boss hole 107 for securing the switch module 300 and the restriction portion 400 to the guide portion 100 by a screw are provided.

Around the guide opening 103 of the lower surface 102 of the guide portion 100, concave portions 108, 109, 110 are provided. The concave portions 108, 109, 110 are engaged with upper-side convex portions 213, 214, 215 (described later) of the movable portion 200, and guide the movement of the movable portion 200 on the XY surface. In this embodiment, all the concave portions 108, 109, 110 have the same shape and the same size. The planar shape of the concave portion 108, 109, 110 on the XY surface is a round-corner triangle approximately similar to the planar shape of the cover opening 501 on the XY surface. The respective concave portions 108, 109, 110 are provided in a position relation with respect to the cover opening 501 on which the guide portion 100 is fixed, in which corresponding sides of the respective triangles are in parallel with each other.

[3-3. Structure of Movable Portion]

The movable portion 200 includes the plate portion 201, the operation portion 203, three extending portions 209, 210, 211, an engage projection 205, a first pressure projection 207, and a second pressure projection 208.

The planar shape of the plate portion 201 on the XY surface is approximately similar to the planar shape of the guide opening 103 of the guide portion 100 on the XY surface. The plate portion 201 is arranged in the guide opening 103. Here, an outer periphery 223 of the plate portion 201 is arranged in a position relation with respect to the inner periphery 111 of the guide opening 103 in which corresponding surfaces of them face each other. The outer periphery 223 is guided by the inner periphery 111 of the guide opening 103, whereby the plate portion 201 is movable in the guide opening 103 on the XY surface.

The operation portion 203 is provided on an upper surface 202 of the plate portion 201 so as to protrude in the Z axis direction. The planar shape of the operation portion 203 on the XY surface is approximately similar to the planar shape of the cover opening 501 on the XY surface. In a position relation similar to the position relation of the cover opening 501 with respect to the guide opening 103, the operation portion 203 is provided on the plate portion 201. As a result, when the plate portion 201 is arranged in the guide opening 103, an outer periphery 221 of the operation portion 203 is arranged in a position relation with respect to an inner periphery 508 of the cover opening 501 in which corresponding surfaces of them face each other. The outer periphery 221 is guided by the inner periphery 508 of the cover opening 501, whereby the operation portion 203 is movable in the cover opening 501 on the XY surface.

As described above, the outer periphery 223 of the plate portion 201 is guided by the inner periphery 111 of the guide opening 103, and the outer periphery 221 of the operation portion 203 is guided by the inner periphery 508 of the cover opening 501, whereby the movable portion 200 is movable on the XY surface. That is, the movable portion 200 is supported by the inner periphery 111 of the guide opening 103 and the inner periphery 508 of the cover opening 501 such that the operation portion 203 is directly movable between two positions of all the combinations of positions corresponding to three apexes of the cover opening 501 being a round-corner triangle. Note that, in the following description, the position of the operation portion 203 located at a position corresponding to any one corner of the round-corner-triangle cover opening 501 is referred to as "corner position".

The extending portions 209, 210, 211 are provided on an end portion of a lower surface 204 of the plate portion 201 so as to protrude from the outer periphery 223. On upper surfaces of tips of the extending portions 209, 210, 211, upper convex portions 212, 213, 214 having truncated cone shapes are provided so as to protrude in the Z axis direction, respectively. The upper convex portions 212, 213, 214 are engaged in the concave portions 108, 109, 110 of the guide portion 100, respectively. As a result, the movable portion 200 is held by the guide portion 100. Further, by bottom surfaces of the concave portions 108, 109, 110, movement of the upper convex portions 212, 213, 214 in the Z-axis up direction is restricted.

On lower surfaces of the tips of the extending portions 209, 210, 211, lower convex portions 215, 216, 217 having approximate hemisphere shapes are provided so as to protrude in the Z axis direction, respectively. On the lower surface of the extending portion 209, a lower convex portion 218 having an approximate hemisphere shape is provided so as to protrude in the Z axis direction. Further, on the lower surface 204 of the plate portion 201, a lower convex portion 219 having an approximate hemisphere shape is provided so as to protrude in the Z axis direction. Tips of the lower convex portions 215-219 are positioned on the same XY surface.

On the lower surface 204 of the plate portion 201, the engage projection 205 is provided. The engage projection 205 is designed so as to be capable of being engaged in an engaging portion 403 (described later) of the restriction portion 400. In this embodiment, the engage projection 205 is provided at a position corresponding to the approximate center of the operation portion 203, and protrudes in the Z axis direction. The engage projection 205 has an approximate cylindrical shape, and has a tip 206 having an approximate hemisphere shape.

When the movable portion 200 moves circularly such that the outer periphery 221 of the operation portion 203 is along the inner periphery 508 of the cover opening 501 and the outer periphery 223 of the plate portion 201 is along the inner periphery 111 of the guide opening 103, the engage projection 205 moves with drawing a triangular path. Also, the upper convex portions 212, 213, 214 move, so as to be along the inner peripheries of the concave portions 108, 109, 110, respectively, with drawing the triangular paths same as the path of the movement of the engage projection 205.

The first pressure projection 207 and the second pressure projection 208 are provided along a rim of the lower surface 204 of the plate portion 201, and protrudes in the Z axis direction. The first pressure projection 207 and the second pressure projection 208 are designed so as to be capable of pressing a first operation piece 311 and a second operation piece 312 (described later) of the switch module 300, respectively. In this embodiment, the first pressure projection 207 and the second pressure projection 208 are provided on the lower surface 204 at positions corresponding to predetermined two sides of the triangle of the operation portion 203, respectively.

[3-4. Structure of Switch Module]

Below the guide portion 100 fixed on the cover 500, the switch module 300 is provided. The switch module 300 includes a printed board 315 on which a wiring pattern is formed, a motherboard connecter 314, an LED board connecter 313, a first switch device 309, and a second switch device 310.

On the printed board 315, position-keeping holes 303, 304 into which the bosses 105, 106 of the guide portion 100 are inserted and penetrating holes 305, 306 307 used for securing to the boss holes 506, 507, 107 by screws, which penetrate between an upper surface 301 side and a lower surface 302 side, are provided.

On the printed board 315, an opening 308 penetrating between the upper surface 301 side and the lower surface 302 side is provided. The opening 308 is designed such that the first pressure projection 207, the second pressure projection 208, and the engage projection 205 of the movable portion 200 are always exposed from the opening 308, and the tips of the lower convex portions 215-219 of the movable portion 200 are always capable of abutting on the upper surface 301 of the switch module 300. The tips of the lower convex portions 215-219 of the movable portion 200 abut on the upper surface 301, whereby movement of the movable portion 200 in the Z-axis down direction is restricted.

The motherboard connecter 314 is mounted on the lower surface 302 of the printed board 315, and the LED board connecter 313 is mounted on the upper surface 301 of the printed board 315. A plurality of respective connection terminals as a contact group of the motherboard connecter 314 and the LED board connecter 313 are connected to a wiring pattern of the printed board 315. The motherboard connecter 314 is connected to the motherboard 10 via a flexible flat cable (not shown). The LED board connecter 313 is connected to an LED board (not shown) via a flexible flat cable (not shown). As described above, the switch module 300 also plays a role of linking the LED board and the motherboard 10.

The first switch device 309 and the second switch device 310 are mounted on the upper surface 301 of the printed board 315 in the vicinity of the opening 308. The first switch device 309 and the second switch device 310 are provided at positions facing the first pressure projection 207 and the second pressure projection 208 of the movable portion 200 in the XY axes directions, respectively. On the first switch device 309 and the second switch device 310, the first operation piece 311 and the second operation piece 312 are provided, respectively. The first operation piece 311 and the second operation piece 312 are design so as to be capable of being pressed by the first pressure projection 207 and the second pressure projection 208 in the XY axes directions, respectively. In this embodiment, the first operation piece 311 and the second operation piece 312 are biased in directions facing the first pressure projection 207 and the second pressure projection 208, respectively, and protrude on the XY surface. By pressing the first operation piece 311 and the second operation piece 312 in directions coming close to the first switch device 309 and the second switch device 310, respectively, the first switch device 309 and the second switch device 310 can be switched to ON states. In this embodiment, together with the movement of the movable portion 200 in the XY directions, the first pressure projection 207 of the movable portion 200 presses the first operation piece 311, whereby the first switch device 309 is switched to the ON state, and the second pressure projection 208 presses the second operation piece 312, whereby the second switch device 310 is switched to the ON state. The first switch device 309 and the second switch device 310 output ON/OFF states to the EC via the flexible flat cable connected to the motherboard connecter 314, respectively.

[3-5. Structure of Restrict Portion]

Figure 9:
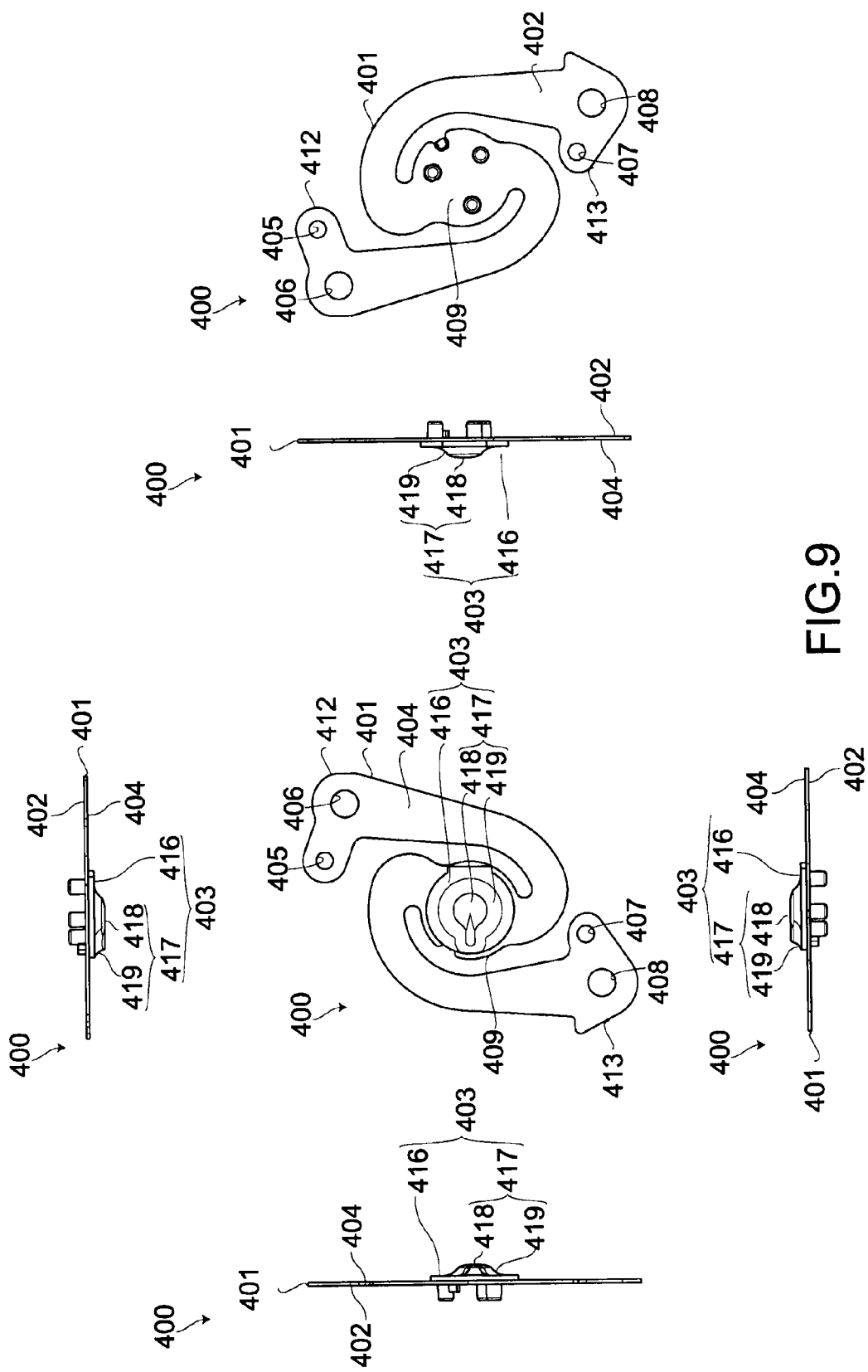
FIG. 9 A six-sided view of a restriction portion.

FIG. 9 is a six-sided view of the restriction portion 400.

Below the switch module 300, the restriction portion 400 is provided. The restriction portion 400 includes a plate spring 401 as a biasing means for example, and the engaging portion 403 provided on the plate spring 401. By the plate spring 401, the engaging portion 403, and the engage projection 205 of the movable portion 200, a position-keeping means for keeping the movable portion 200 being movable in predetermined positions is structured.

The plate spring 401 is structured by using, for example, a thin metal such as stainless or the like, resin, or the like. On one end portion 412 of the plate spring 401, a position-keeping hole 405 into which the boss 105 of the guide portion 100 is inserted and a penetrating hole 406 used for securing to the boss hole 507 of the cover 500 by a screw, which penetrate between an upper surface 402 side and a the lower surface 404 side, are provided. On another end portion 413 of the plate spring 401, a position-keeping hole 407 into which the boss 106 of the guide portion 100 is inserted and a penetrating hole 408 used for securing to the boss hole 107 of the guide portion 100 by a screw, which penetrate between the upper surface 402 side and the lower surface 404 side, are provided. In the plate spring 401, the both end portions 412, 413 are supported through those holes 405-408.

The engaging portion 403 is structured by, for example, resin. The engaging portion 403 is fixed on a middle portion 419 of the respective both end portions 412, 413 as support points so as to be capable of facing the engage projection 205 of the movable portion 200. The engaging portion 403 is capable of moving in the Z axis direction by a bias force of the plate spring 401.

The engaging portion 403 includes a base portion 416 and a bulge portion 417. The base portion 416 is placed on the plate spring 401 and has a flat-plate shape. The bulge portion 417 is provided on an upper surface of the base portion 416 and bulges in the Z axis direction. The bulge portion 417 includes a tapered surface 419 and an approximately-flat top surface 418.

Figure 10:
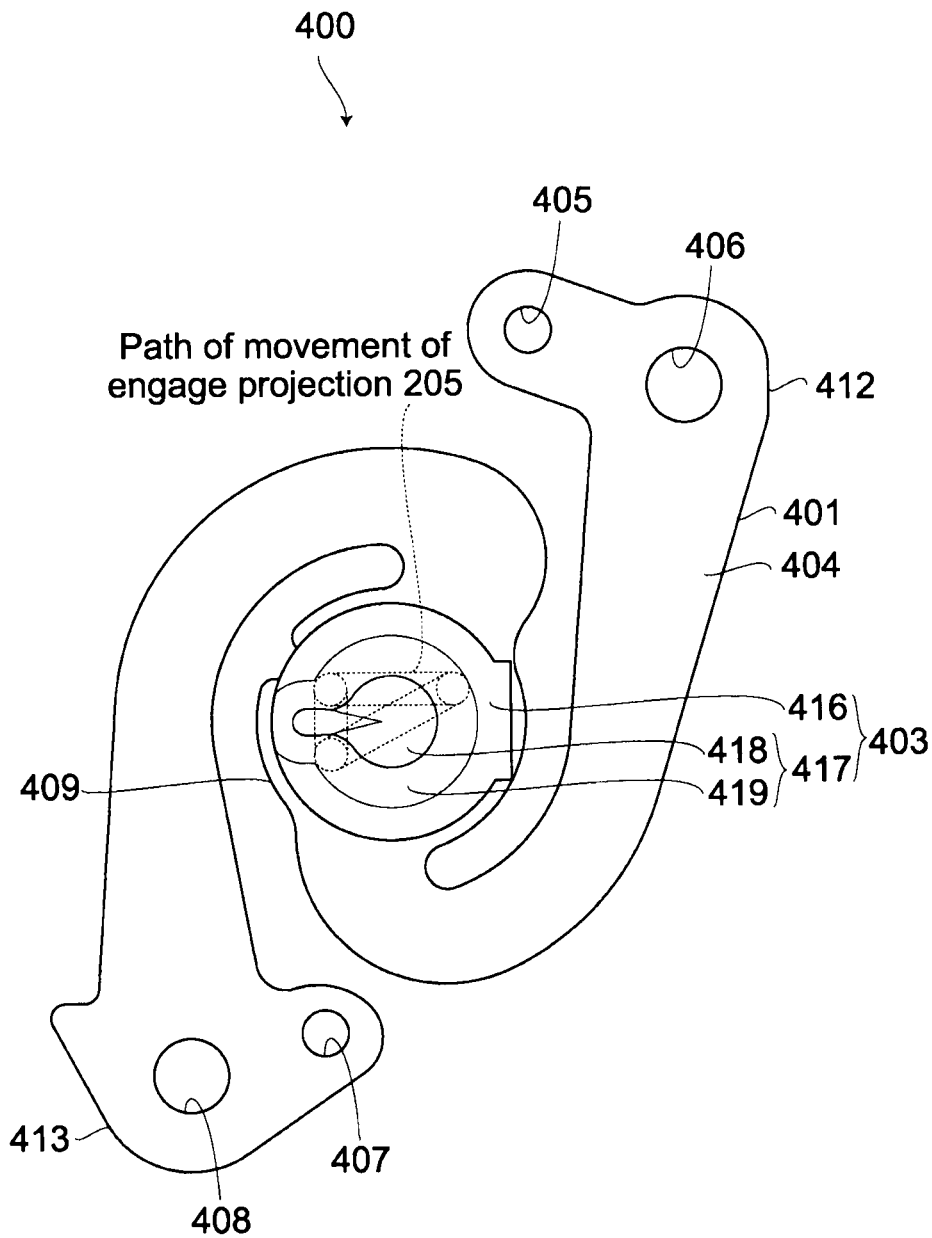
FIG. 10 A top view of the restriction portion.

FIG. 10 is a top view of the restriction portion 400, and is a diagram showing a path of the movement of the engage projection 205 of the movable portion 200.

As shown by three dotted circles in the drawing, the engaging portion 403 is designed such that, when the operation portion 203 is in the three corner positions of the cover opening 501, the engage projection 205 is located corresponding to the tapered surface 419. Further, as shown by a dotted triangle in the drawing, the bulge portion 417 is designed such that, when the operation portion 203 directly moves from one arbitrary corner position to another corner position, the engage projection 205 moves on the top surface 418 of the bulge portion 417.

[4. Operation of Movable Portion and Restrict Portion]

Next, an operation of the movable portion 200 and the restriction portion 400 in the switch unit 7 structured as described above when the operation portion 203 moves among the three corner positions along the inner periphery 508 of the triangular cover opening 501 will be described.

Figure 11:
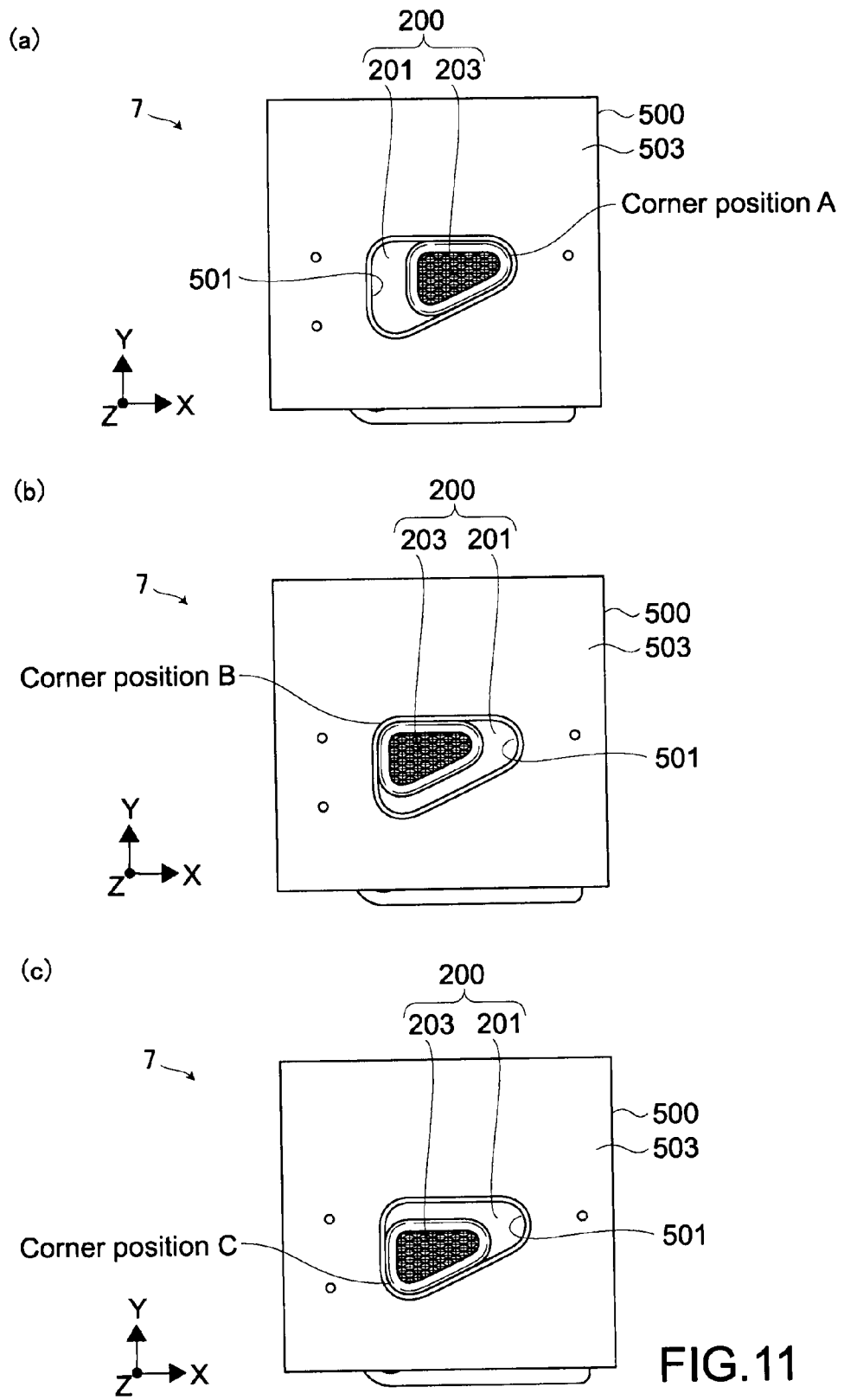
FIG. 11(a) shows that an operation portion is located in a corner position A.
FIG. 11(b) shows that the operation portion is located in a corner position B.
FIG. 11(c) shows that the operation portion is located in a corner position C.

FIG. 11 show that the operation portion 203 is positioned in the three corner positions of the cover opening 501, respectively.

In the following description, the three corner positions are referred to as "corner positions A, B, C". FIG. 11(a) shows that the operation portion 203 is located in the corner position A. FIG. 11(b) shows that the operation portion 203 is located in the corner position B. FIG. 11(c) shows that the operation portion 203 is located in the corner position C.

Here, an operation of the movable portion 200 and the restriction portion 400 when the operation portion 203 moves along the inner periphery 508 of the triangular cover opening 501 from the corner position B to the corner position A in the X axis direction will be described.

FIG. 12 are schematic diagrams showing an operation of the movable portion 200 and the restriction portion 400. Note that the schematic diagrams are, to make the description easy to understand, drawn by modifying from the actual shapes.

As shown in FIG. 12(a), the operation portion 203 is kept in the corner position B. Here, the tip 206 of the engage projection 205 pressure-contacts, by a bias force of the plate spring 401, a tapered surface 419a (first tapered surface) of the bulge portion 417 of the engaging portion 403 of the restriction portion 400. By an interference of the tip 206 of the engage projection 205 and the tapered surface 419a of the bulge portion 417 by the bias force of the plate spring 401, movement of the movable portion 200 in a direction that the engage projection 205 proceeds to the bulge portion 417 is restricted. Further, by the interference of the tip 206 of the engage projection 205 and the tapered surface 419a of the bulge portion 417 by the bias force of the plate spring 401, the outer periphery 221 of the operation portion 203 is abutted on the inner periphery 508 of the cover opening 501, and the outer periphery 223 of the plate portion 201 is abutted on the inner periphery 111 of the guide opening 103. As a result, movement of the movable portion 200 in directions proceeding to the inner periphery 508 of the cover opening 501 on which the operation portion 203 abuts is restricted. As described above, movement of the movable portion 200 in the direction that the engage projection 205 proceeds to the bulge portion 417 is restricted, and movement in the directions proceeding to the inner periphery 508 of the cover opening 501 on which the operation portion 203 abuts is restricted, whereby movement of the movable portion 200 on the XY surface is restricted.

As shown in FIG. 12(b), a user (shown by U in the drawings) applies pressure in the X axis direction in order to move the operation portion 203 of the movable portion 200 kept in the corner position B in the X axis direction. When the pressure from the user exceeds a predetermined value, the movable portion 200 starts to move in the X axis direction. When the movable portion 200 starts to move, because of the interference of the tip 206 having the approximate hemisphere shape of the engage projection 205 and the tapered surface 419a of the bulge portion 417, the engage projection 205 presses down the bulge portion 417 against the bias force of the plate spring 401. Therefore, in this period of time, the user senses a feeling of resistance in the movement operation of the movable portion 200. The feeling of resistance suddenly decreases in a state where the engage projection 205 reaches the top surface 418 of the bulge portion 417, and becomes one caused by friction of the tip 206 having the approximate hemisphere shape of the engage projection 205 and the top surface 418 of the bulge portion 417. Such a change of the feeling of resistance is given to the user as a click feeling.

As shown in FIG. 12(c), when the user continuously moves the operation portion 203 in the X axis direction, the engage projection 205 reaches, via the top surface 418 of the bulge portion 417, an interference position with an opposite-side tapered surface 419b (second tapered surface). Then, because of the bias force of the plate spring 401, the engage projection 205 is pulled-in along the tapered surface 419b, and as a result, the operation portion is moved to the corner position A. Because of this, the engage projection 205 is kept in the corner position A. Because of such a bias force of the plate spring 401 and taper effects, the operation of leading the engage projection 205 is supplied to the user as a pull-in feeling.

Note that, here, although the operation of the movable portion 200 and the restriction portion 400 when the operation portion 203 moves from the corner position B to the corner position A in the X axis direction has been described, the same applies to movement of the operation portion 203 between two positions of all the combinations of the corner positions A, B, C.

[5. Operation of Switch Unit]

Next, an operation of the switch unit 7 when the operation portion 203 moves from each one corner position to another corner position along the inner periphery 508 of the triangular cover opening 501 will be described.

An operation of the switch unit 7 when the operation portion 203 moves in the order of the corner position A, the corner position B, the corner position C, and the corner position A (anticlockwise) will be described.

Figure 13:
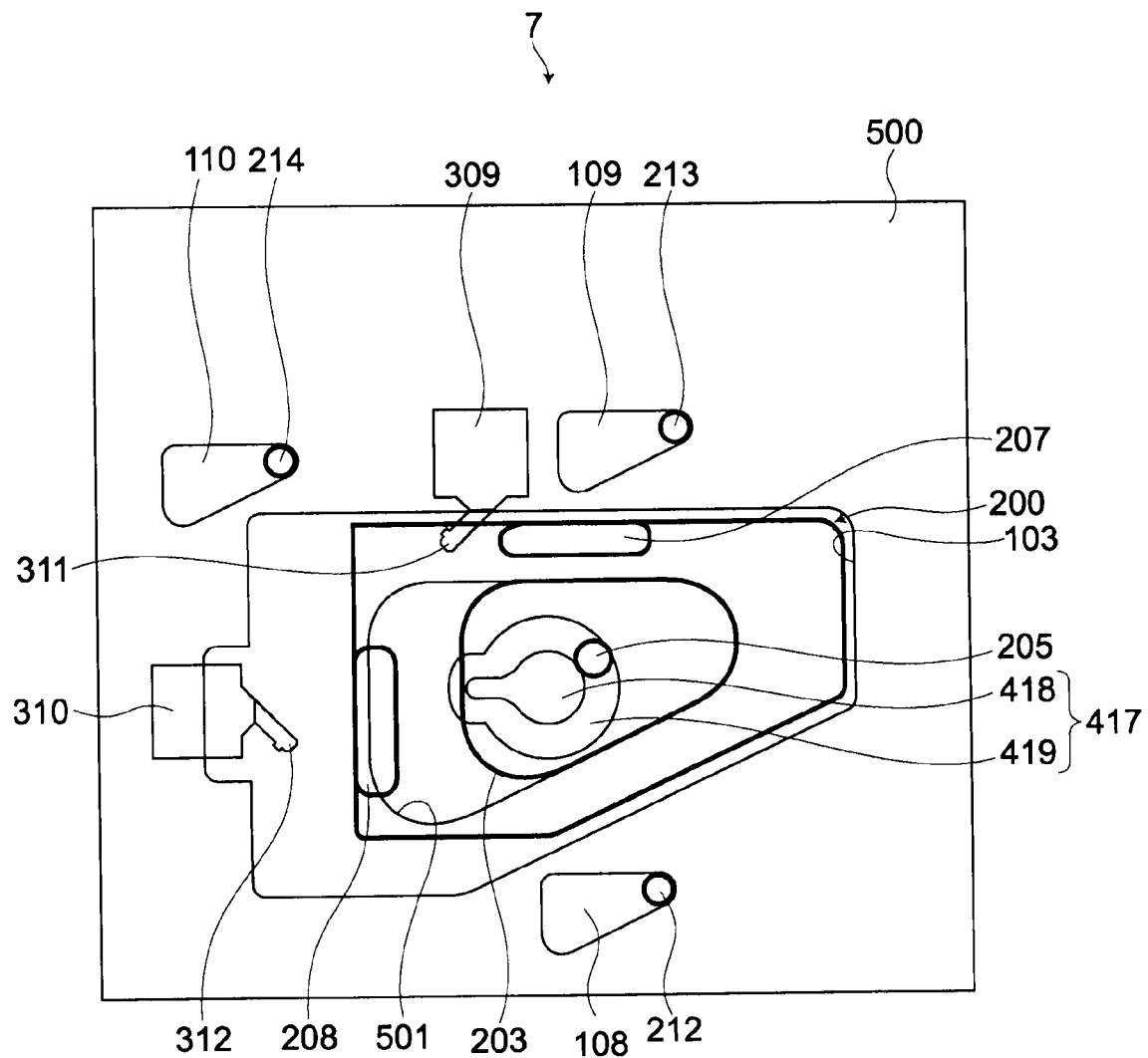
FIG. 13 A transparent top view schematically showing the switch unit when the operation portion is located in a corner position A.

FIG. 13 is a transparent top view schematically showing the switch unit 7 when the operation portion 203 is located in the corner position A.

Note that, in this drawing, to make the drawing easy to understand, illustrations of portions not directly necessary for the following description will be omitted. The same applies to the following drawings.

In the movable portion 200 (shown by bold lines), when the operation portion 203 is located in the corner position A, the outer periphery 221 of the operation portion 203 abuts on the inner periphery of the cover opening 501, and the outer periphery 223 of the plate portion 201 abuts on the inner periphery 111 of the guide opening 103. The engage projection 205 is located on the tapered surface 419. The upper convex portions 212, 213, 214 are located in corner positions corresponding to the corner position A of the cover opening 501 of the concave portions 108, 109, 110 of the guide portion 100. When the operation portion 203 is located in the corner position A, the first operation piece 311 and the second operation piece 312 are not operated, and the first switch device 309 and the second switch device 310 are in the OFF state.

In the movable portion 200, when the operation portion 203 moves from the corner position A to the corner position B, the engage projection 205 passes the top surface 418. The movable portion 200 moves while the operation portion 203 is along the inner periphery of the cover opening 501 and the plate portion 201 is along the inner periphery 111 of the guide opening 103. The upper convex portions 212, 213, 214 move along the inner peripheries of the concave portions 108, 109, 110. The first pressure projection 207 and the second pressure projection 208 abut on the first operation piece 311 and the second operation piece 312 of the first switch device 309 and the second switch device 310, and press, against the bias forces of the first operation piece 311 and the second operation piece 312, the first operation piece 311 and the second operation piece 312. As a result, the first switch device 309 and the second switch device 310 are switched to the ON states.

Figure 14:
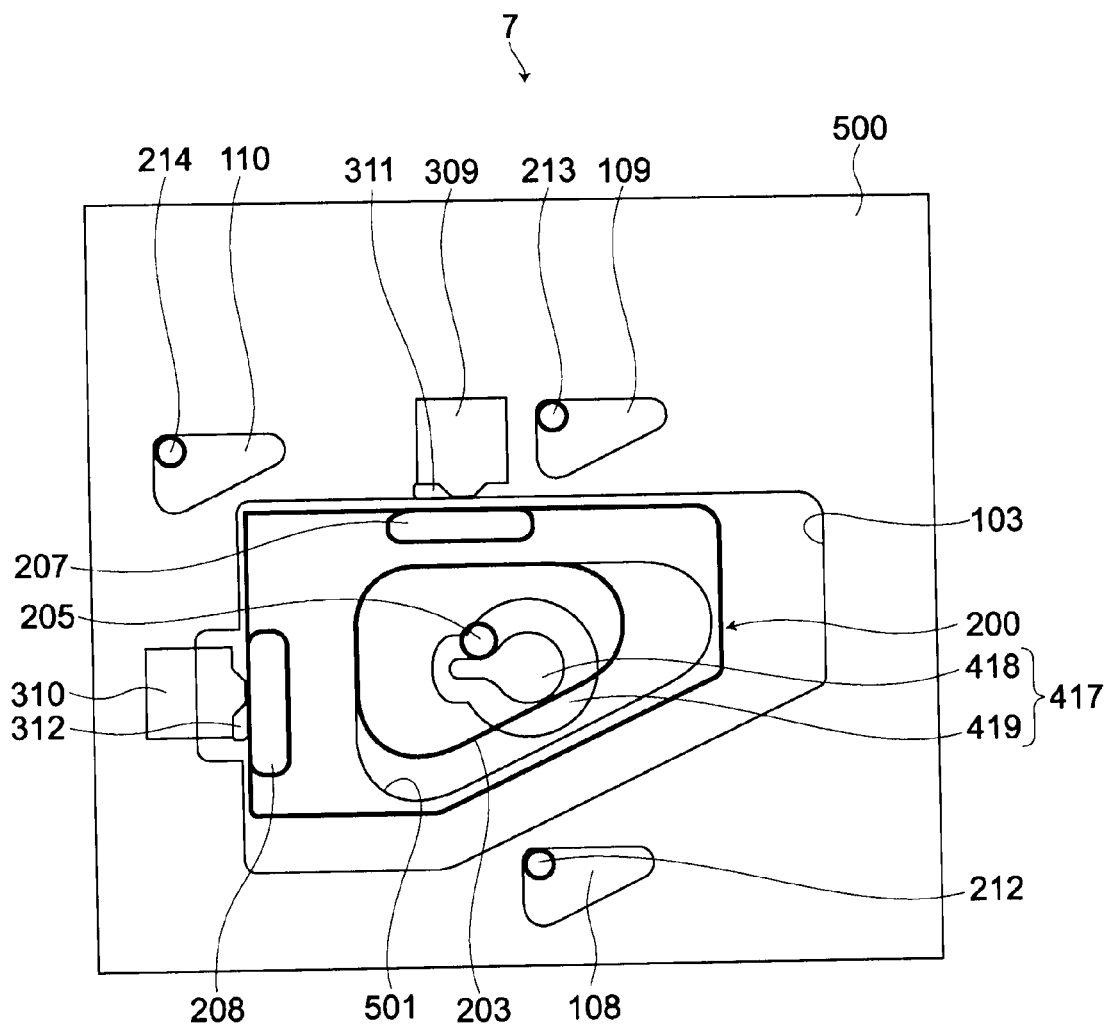
FIG. 14 A transparent top view schematically showing the switch unit when the operation portion is located in a corner position B.

FIG. 14 is a transparent top view schematically showing the switch unit 7 when the operation portion 203 is located in the corner position B.

In the movable portion 200, when the operation portion 203 reaches the corner position B, the engage projection 205 also reaches the tapered surface 419. The upper convex portions 212, 213, 214 are located in corner positions corresponding to the corner position B of the cover opening 501 of the concave portions 108, 109, 110 of the guide portion 100. The first pressure projection 207 and the second pressure projection 208 further press the first operation piece 311 and the second operation piece 312 of the first switch device 309 and the second switch device 310.

In the movable portion 200, when the operation portion 203 moves from the corner position B to the corner position C, the engage projection 205 passes the top surface 418. The movable portion 200 moves while the operation portion 203 is along the inner periphery of the cover opening 501 and the plate portion 201 is along the inner periphery 111 of the guide opening 103. The upper convex portions 212, 213, 214 move along the inner peripheries of the concave portions 108, 109, 110 of the guide portion 100. The first pressure projection 207 moves, because of the bias force of the first operation piece 311, while the tip of the first operation piece 311 abuts on the side surface of the first pressure projection 207, in a direction apart from the first switch device 309. The second pressure projection 208 moves while keeping the pressure state of the second operation piece 312.

Figure 15:
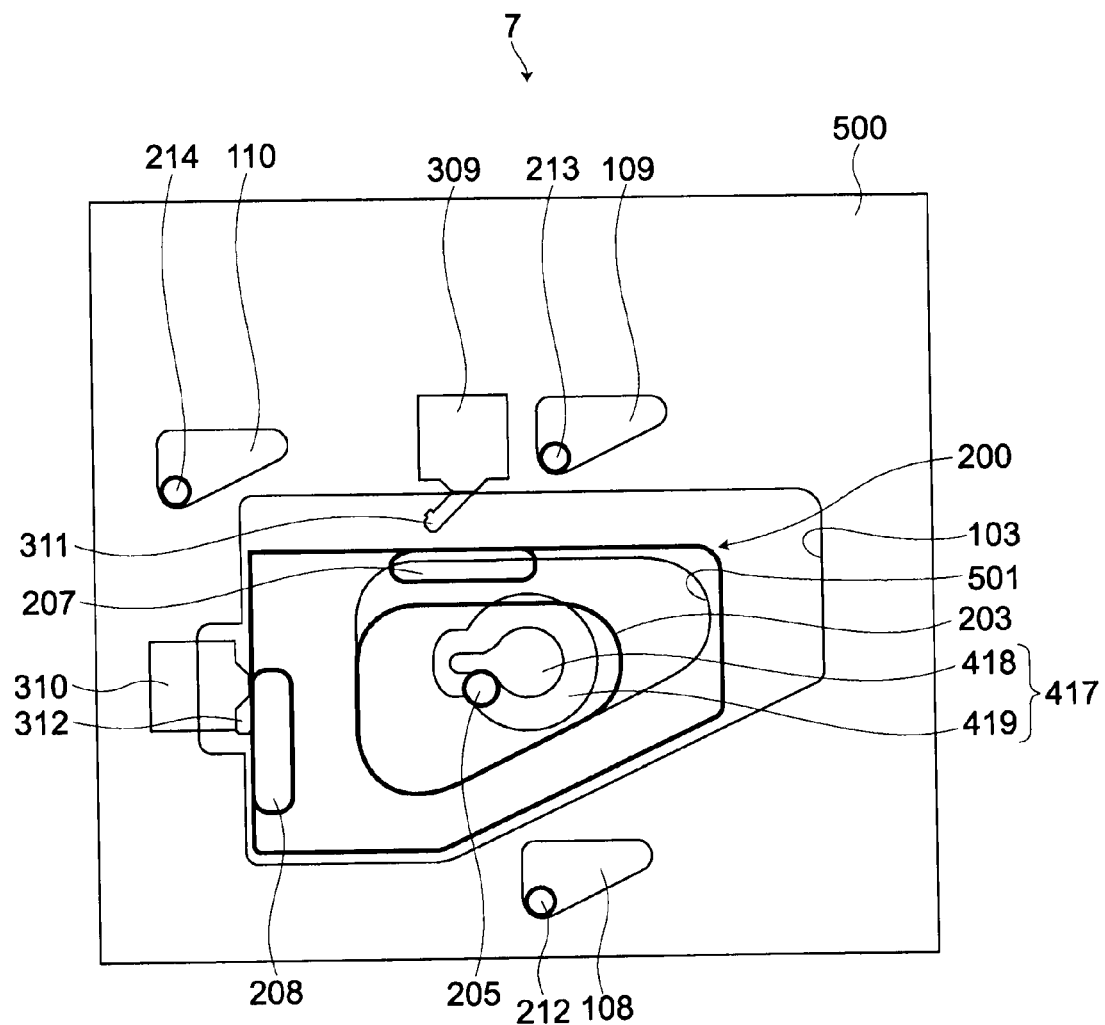
FIG. 15 A transparent top view schematically showing the switch unit when the operation portion is located in a corner position C.

FIG. 15 is a transparent top view schematically showing the switch unit 7 when the operation portion 203 is located in the corner position C.

In the movable portion 200, when the operation portion 203 reaches the corner position C, the engage projection 205 also reaches the tapered surface 419. The upper convex portions 212, 213, 214 are located in corner positions corresponding to the corner position C of the cover opening 501 of the concave portions 108, 109, 110 of the guide portion 100. The first pressure projection 207 departs from the first operation piece 311. As a result, the first switch device 309 is switched to the OFF state. The second pressure projection 208 continuously presses the second operation piece 312. As a result, the ON state of the second switch device 310 is maintained.

In the movable portion 200, when the operation portion 203 moves from the corner position C to the corner position A, the engage projection 205 passes the top surface 418. The movable portion 200 moves while the operation portion 203 is along the inner periphery of the cover opening 501 and the plate portion 201 is along the inner periphery 111 of the guide opening 103. The upper convex portions 212, 213, 214 move along the inner peripheries of the concave portions 108, 109, 110 of the guide portion 100. The second pressure projection 208 moves, because of the bias force of the second operation piece 312, while the tip of the second operation piece 312 abuts on the side surface of the second pressure projection 208, in the direction apart from the second switch device 310. When the operation portion 203 reaches the corner position A, the second pressure projection 208 departs from the second operation piece 312. As a result, the second switch device 310 is switched to the OFF state.

As described above, when the operation portion 203 is in the corner position A, the first switch device 309 and the second switch device 310 are in the OFF states, when in the corner position B, the first switch device 309 and the second switch device 310 are in the ON states, and when in the corner position C, the first switch device 309 is in the OFF state and the second switch device 310 is in the ON state. The first switch device 309 and the second switch device 310 output the ON/OFF states to the EC, respectively.

Here, although the operation of the switch unit 7 when the operation portion 203 moves anticlockwise from the corner position A has been described, the same applies to the operation of the switch unit 7 when the operation portion 203 moves clockwise from the corner position A. As described above, according to the switch unit 7 of this embodiment, it is possible to directly move the operation portion 203 between the two positions of all the combinations of the corner positions A, B, C. As a result, according to the switch unit 7 of this embodiment, it is possible to directly switch the three modes of drawing processing among all the modes.

According to the switch unit 7 of this embodiment, since the switch module 300 in which, because of the pressure in the XY axes directions being movement directions of the movable portion 200, the ON/OFF states of the first switch device 309 and the second switch device 310 are switched among three kinds of combinations is employed, the switch mechanism can be simplified. Further, because the operation portion 200 is kept in the three corner positions by the position-keeping means, there is a low possibility that the ON/OFF states of the first switch device 309 and the second switch device 310 are changed against a user's will, and the reliability is increased.

In a case where, in order to be capable of directly switching a plurality of modes, switches for the respective modes are individually provided, there is a fear that the size of the whole switches be larger. However, in the switch unit 7 of this embodiment, since direct switching among three modes is realized structurally, by structuring the respective mechanism elements smaller, the switch unit 7 can be downsized. Further, by covering the cover opening 501 by the plate portion 201 of the movable portion 200 from the inside, the inside of the switch unit 7 is not visible from the outside, and is well-designed.

Embodiments according to the present invention are not limited to the embodiment as described above, but other various kinds of embodiments may be employed.

The structure of the switch unit 7 of this embodiment can be applied to various kinds of slide switch units.

For example, in this embodiment, the movable portion 200 is supported so as to be directly movable between two positions of all the combinations of the three corner positions of the triangle of the cover opening 501, and kept in the respective three corner positions. However, it is not limited to this. By changing the shapes of the cover opening 501, the guide opening 103, and the movable portion 200, the shape of the bulge portion 417, and the like, the movable portion is supported so as to be directly movable between two positions of all the combinations of the four or more corner positions of a polygon, and kept in the respective four or more corner positions. As a result, it is possible to prevent operating errors of the switch unit 7 from occurring.

Alternatively, by providing the restriction portion 400 and the like between respective adjacent two positions of a slide switch unit in which a movable portion is movable among two or more positions on a straight line, movement of the movable portion 200 may be restrictable. As a result, the endpoint position of the slide movement is rattle-free, and it is possible to give a click feeling and a pull-in feeling to a user. As a result, operating errors of the switch unit 7 can be prevented.

An operation force of the movable portion 200 can be adjusted by adjusting a bias force of the plate spring 401 of the restriction portion 400. Further, by changing the shape of the bulge portion 417, the shape of the engage projection 205 of the movable portion 200, the bias force of the plate spring 401, or the like, it is possible to give a desired click feeling and a pull-in feeling to a user.

Although it has been described that the switch unit 7 is used to switch modes of drawing processing, not limited to this, it can be used to switch various operation processing.

DESCRIPTION OF SYMBOLS

1 . . . PC (Personal Computer)
7 . . . switch unit
100 . . . guide portion
103 . . . guide opening
501 . . . cover opening
200 . . . movable portion
201 . . . plate portion
203 . . . operation portion
205 . . . engage projection (position-keeping means)
300 . . . switch module (detecting section)
400 . . . restrict portion
401 . . . plate spring (position-keeping means)
403 . . . engaging portion (position-keeping means)
417 . . . bulge portion
418 . . . top surface
419 . . . tapered surface
419a . . . first tapered surface
419b . . . second tapered surface
500 . . . cover

The invention claimed is:

1. An information processing apparatus, comprising:
a switch unit including a movable portion capable of being operated by a user, a support portion supporting the movable portion so as to be directly movable between two positions of all the combinations of three or more positions, and a detecting section detecting that the movable portion has moved to each of the positions; and
a control section recognizing a detecting result by the detecting section, wherein the switch unit further include a position-keeping means keeping the movable portion in each of the positions, wherein the switch unit further includes an engaging portion having a first tapered surface and a second tapered surface provided between the respective two positions and causing interference with the movable portion at different timings in the process of movement of the movable portion between the respective two positions, respectively, the first tapered surface restricting the movement of the movable portion, the second tapered surface urging movement of the movable portion.

2. The information processing apparatus according to claim 1, wherein the switch unit further includes a biasing means biasing the respective tapered surfaces of the engaging portion and the movable portion so as to be in pressure-contact.

3. The information processing apparatus according to claim 2, wherein
the control section switches an operation processing of the information processing apparatus based on the detection result.

4. A switch device, comprising: a movable portion capable of being operated by a user; a support portion supporting the movable portion so as to be directly movable between two positions of all the combinations of three or more positions; and a detecting section detecting that the movable portion has moved to each of the positions, a position-keeping means keeping the movable portion in each of the positions, an engaging portion having a first tapered surface and a second tapered surface provided between the respective two positions and causing interference with the movable portion at different timings in the process of movement of the movable portion between the respective two positions, respectively, the first tapered surface restricting the movement of the movable portion, the second tapered surface urging movement of the movable portion.

5. The switch device according to claim 4, further comprising:
a biasing means biasing the respective tapered surfaces of the engaging portion and the movable portion so as to be in pressure-contact.

* * * * *